United States Patent
Boelling et al.

(10) Patent No.: US 8,062,138 B2
(45) Date of Patent: Nov. 22, 2011

(54) TORSIONAL VIBRATION DAMPER COMPRISING END BLOCKS AND DRIVE TRAIN COMPRISING SAID TORSIONAL VIBRATION DAMPER

(75) Inventors: Jochen Boelling, Baden-Baden (DE); Christian Bernhard Halm, Walldorf, DE (US); Till Lutz Martin Ebner, Pfungstadt (DE); Volker Heinz, Roemerberg (DE); Michael Wilhelm Schaefer, Ketsch (DE)

(73) Assignee: BorgWarner Inc., Auburn Hills, MI (US)

( * ) Notice: Subject to any disclaimer, the term of this patent is extended or adjusted under 35 U.S.C. 154(b) by 234 days.

(21) Appl. No.: 12/517,822

(22) PCT Filed: Nov. 15, 2007

(86) PCT No.: PCT/EP2007/009860
§ 371 (c)(1),
(2), (4) Date: Jun. 5, 2009

(87) PCT Pub. No.: WO2008/071281
PCT Pub. Date: Jun. 19, 2008

(65) Prior Publication Data
US 2010/0323801 A1    Dec. 23, 2010

(30) Foreign Application Priority Data
Dec. 14, 2006 (DE) .......................... 10 2006 059 054

(51) Int. Cl.
*F16F 15/121* (2006.01)
(52) U.S. Cl. .................................................. 464/68.92
(58) Field of Classification Search ............... 464/68.92, 464/68.9, 68.1; 74/572.2; 192/203–205
See application file for complete search history.

(56) References Cited

U.S. PATENT DOCUMENTS

| | | | | |
|---|---|---|---|---|
| 4,996,892 A * | 3/1991 | Yamamoto | ................. | 464/68.41 |
| 6,962,533 B2 * | 11/2005 | Zottmann et al. | .......... | 464/68.92 |
| 7,238,112 B2 * | 7/2007 | Bastel et al. | ................. | 464/68.4 |
| 7,252,593 B2 * | 8/2007 | Kroll et al. | ................. | 464/68.41 |
| 7,481,132 B2 * | 1/2009 | Mende et al. | ................. | 74/574.3 |
| 7,784,595 B2 * | 8/2010 | Bauer et al. | ................. | 192/55.61 |
| 2002/0128074 A1 * | 9/2002 | Jackel et al. | .................... | 464/68 |
| 2002/0129074 A1 | 9/2002 | Shachar | ......................... | 464/68 |
| 2002/0147051 A1 * | 10/2002 | Jackel et al. | .................... | 464/68 |

(Continued)

FOREIGN PATENT DOCUMENTS

DE    198 10 500 A1    10/1998

(Continued)

*Primary Examiner* — Gregory Binda
*Assistant Examiner* — Matthieu Setliff
(74) *Attorney, Agent, or Firm* — Bliss McGlynn, P.C.

(57) ABSTRACT

A torsional vibration damper includes a primary element with at least one primary driver, a secondary element with at least one secondary driver, at least one spring device between the primary and secondary drivers for resiliently elastic coupling of the primary and secondary elements, and at least one end block arranged on an end side of the spring device. The primary element is rotatable relative to the secondary element from a neutral position into a first position, in which the primary driver is supported only on the spring device, and from the first position onward into a second position, in which the primary driver is supported on the spring device and on the end block. In the first and second positions of the primary element, torque of the torsional vibration damper can be transmitted exclusively directly between the primary driver and spring device.

14 Claims, 6 Drawing Sheets

U.S. PATENT DOCUMENTS

| | | | |
|---|---|---|---|
| 2004/0182196 A1* | 9/2004 | Jaeckel et al. | 74/574 |
| 2004/0185939 A1* | 9/2004 | Jee | 464/66 |
| 2004/0200313 A1* | 10/2004 | Kroll et al. | 74/574 |
| 2004/0248654 A1* | 12/2004 | Jackel et al. | 464/68 |
| 2005/0020365 A1* | 1/2005 | Bastel et al. | 464/68 |
| 2005/0070362 A1* | 3/2005 | Mende et al. | 464/68 |

FOREIGN PATENT DOCUMENTS

| | | |
|---|---|---|
| EP | 1818557 A1 * | 8/2007 |
| FR | 2 829 819 A | 3/2003 |

* cited by examiner

TORSIONAL VIBRATION DAMPER COMPRISING END BLOCKS AND DRIVE TRAIN COMPRISING SAID TORSIONAL VIBRATION DAMPER

CROSS-REFERENCE TO RELATED APPLICATION

This application claims benefit of PCT Patent Application PCT/EP2007/009860 entitled "TORSIONAL VIBRATION DAMPER COMPRISING END BLOCKS AND DRIVE TRAIN COMPRISING SAID TORSIONAL VIBRATION DAMPER" and filed on Nov. 15, 2007.

BACKGROUND OF THE INVENTION

1. Field of the Invention

The present invention relates to a torsional vibration damper having a primary element with at least one primary driver, having a secondary element with at least one secondary driver, having at least one spring device between the primary driver and the secondary driver for the resiliently elastic coupling of the primary element and secondary element, and having at least one end block which is arranged on the end side of the spring device, with the primary element being rotatable relative to the secondary element from a neutral position into a first position, in which the primary driver is supported only on the spring device, and from the first position onward into a second position, in which the primary driver is supported on the spring device and on the end block. The present invention also relates to a drive train having a torsional vibration damper of said type.

2. Description of the Related Art

The prior art discloses various torsional vibration dampers which are also referred to as rotary vibration dampers or dual-mass flywheels. The known torsional vibration dampers are used in particular in automobile manufacture for elastically coupling the internal combustion engine and the drive train. In this way, it is intended to prevent torsional vibrations from being transmitted from the internal combustion engine to the drive train or to the transmission. Such a transmission occurs in particular in the case of internal combustion engines with a comparatively small number of cylinders and at low engine speeds. With effective damping of such vibrations, the internal combustion engine can be operated at low rotational speeds, which generally results in reduced fuel consumption.

For example, DE 199 58 814 A1 describes a rotary vibration damper in the form of a dual-mass flywheel. The known rotary vibration damper has a central disk element with a plurality of support arms arranged on the periphery, and a further disk element which is composed of two covering disk elements on which support projections are provided. Spring devices for resiliently elastically coupling the central disk element and the further disk element are provided between the support projections. The spring devices are composed of a plurality of spring elements which are arranged in succession in the tangential direction.

Support elements are arranged on the end sides of the spring devices known from DE 199 58 814 A1, which support elements are in practice also referred to as end blocks and adjoin an end-side spring element of the respective spring device. The end block also has a leadthrough opening which faces toward the support arm, while the support arm comprises a projection which faces toward the leadthrough opening. If the central disk element is rotated from a neutral position into a first position relative to the further disk element, then the projection of the support arm extends through the passage opening and is supported on the end-side spring element even before the support arm is supported on the end block. If the central disk element is rotated beyond the first position into a second position, then the spring element is already acted on directly with pressure by the projection. When the second position is reached, the support arm is also supported on the end block, such that the spring element is additionally acted on with pressure via the end block.

The known rotary vibration damper, by means of its spring device in which the spring element is acted on with pressure firstly directly by the support arm and subsequently indirectly via the end block, ensures that the damping function has a smooth onset. It is also possible for the transition noises in the event of a change from traction to overrun, which transition noises are generated as the support arm impacts against the end block, to be reduced in this way. A disadvantage is however that the initial damping effect is not sufficiently intense if the support arm is acted on with a particularly large torque. In said case, when the support arm impacts against the end block, transition noises still occur. Furthermore, severe wear or abrasion occurs on the end block, which wear or abrasion leads inter cilia to a contamination of the oil within the torsional vibration damper.

To prevent the abovementioned transition noises during changes from traction to overrun, EP 1584839 A1 proposes a torsional vibration damper in which the end block is designed such that the torque is transmitted exclusively directly from a primary driver or support arm to the spring element of the spring device. The primary driver is no longer supported at all on the end block. In this way, although the transition noises are reliably reduced, problems can occur here with regard to the guidance of the end block in the tangential direction.

It is therefore an object of the present invention to create a torsional vibration damper which firstly ensures low transition noises in the event of changes from traction to overrun and low wear or abrasion to the end block, and secondly ensures reliable guidance and functioning of the end block. The invention is also based on the object of creating a drive train having a torsional vibration damper of said type.

SUMMARY OF THE INVENTION

The present invention overcomes the disadvantages in the related art in a torsional vibration damper that includes a primary element with at least one primary driver, a secondary element with at least one secondary driver, at least one spring device between the primary and secondary drivers for resiliently elastic coupling of the primary and secondary elements, and at least one end block arranged on an end side of the spring device. The primary element is rotatable relative to the secondary element from a neutral position into a first position, in which the primary driver is supported only on the spring device, and from the first position onward into a second position, in which the primary driver is supported on the spring device and on the end block. In the first and second positions of the primary element, torque of the torsional vibration damper can be transmitted exclusively directly between the primary driver and spring device.

Conventionally, the primary element is to be understood to mean that element which is assigned to the input side of the torsional vibration damper, such as for example to the engine, while the secondary element is to be understood to mean that element which is assigned to the output side, such as for example to the transmission. However, the invention also encompasses embodiments in which the primary element is assigned to the output side and the secondary element is assigned to the input side. In the case of two spring devices, it is for example possible for four end blocks to be provided, which end blocks are arranged on those face sides of the spring devices which face toward the primary driver. The spring devices may for example be composed of a multiplicity of spring elements or spring sets which are arranged in succession in the tangential direction. In the first position, the primary driver is not yet supported on the end block.

Since the torques are transmitted exclusively directly between the primary driver and the spring device, while no indirect transmission takes place via the end block, as is the case for example in the rotary vibration damper according to DE 199 58 814 A1, the loading of the end block and therefore the wear and the abrasion to the end block are low. The end block can also be designed with reduced stability, for example by virtue of corrugations or cavities being formed in the end block, which corrugations or cavities reduce the weight of said end block without deformation of the end block taking place. Furthermore, by means of the torsional vibration damper according to the invention, a reduction in the transition noises during a change from traction to overrun is ensured, since the primary driver impacts firstly against the spring device and only subsequently against the end block. Since the primary driver does not transmit any torques via the end block to the spring device, but is nevertheless supported on the end block in the second position, reliable guidance of the end block by the primary driver, and therefore the function of the end block, are also ensured. For example, an excessively large spacing between the end block and the spring device which is compressed by the primary driver is prevented, since the end block can be driven along by the primary driver in the direction of the spring device.

In one preferred embodiment of the torsional vibration damper according to the invention, the primary driver has a first section for support on the spring device and a second section for support on the end block. It is thus possible, for example, for the first section to be supported, in the first and second positions of the primary element, on the spring device so as to act on the latter with pressure, while the second section can be supported, in the second position of the primary element, on the end block. The first and second sections may for example be formed in one piece.

In one particularly preferred embodiment of the torsional vibration damper according to the invention, the second section is arranged radially at the outside on the first section.

According to a further preferred embodiment of the torsional vibration damper according to the invention, the second section is arranged so as to be recessed relative to the first section with respect to the tangential direction. Since the primary driver could act on corresponding end blocks in both rotational directions, the second section may be arranged so as to be recessed relative to the first section both with respect to the one tangential direction and also with respect to the other tangential direction.

In one advantageous embodiment of the torsional vibration damper according to the invention, the end block has a cutout for the insertion or leadthrough, without contact, of the first section of the primary driver. In this way, it is ensured that the first section of the primary driver does not adjoin the end block. The cutout also leads to a low weight of the end block.

In a further advantageous embodiment of the torsional vibration damper according to the invention, the cutout is designed so as to be continuous, preferably groove-shaped, in the tangential direction.

In one particularly advantageous embodiment of the torsional vibration damper according to the invention, the second section of the primary driver can be supported on a face side of the end block. Here, a face side is to be understood as that side on an end of the end block which points in the tangential direction. In this way, the second section of the primary driver adjoins the end block, whereas the first section is guided without contact in or through the cutout.

According to a further advantageous embodiment of the torsional vibration damper according to the invention, the end block has at least one support part for supporting the spring device on the end block. Said support part may for example be a support part which runs in the radial direction, transversely with respect to the tangential direction. The support part ensures, for example, that the end block is driven back in the direction of the primary driver by the expanding spring device.

In a further advantageous embodiment of the torsional vibration damper according to the invention, the end block also has a sliding part, which extends in the tangential direction, for the sliding support of the end block, on which sliding part the support part is arranged. It is thus possible, for example, for the sliding part to be guided on an outer annular wall of the secondary element and to have a corresponding radially outwardly pointing sliding surface.

In a further preferred embodiment of the torsional vibration damper according to the invention, the support part is designed such that the spring device is supported on the support part only in the direction of the primary driver. It is thus possible for the end block to be pushed in the direction of the primary driver by the expanding spring device, while the end block is moved in the direction of the spring device by the primary driver or by the second section thereof. The end block accordingly need not be fastened to the spring device, for example to an end-side spring element thereof, as a result of which the end block can be of simpler design, and an assembly step is omitted during the assembly of the torsional vibration damper.

According to a further particularly preferred embodiment of the torsional vibration damper according to the invention, the spring device has at least two spring elements which are arranged in series in the tangential direction and between which is arranged a sliding block, with a spacing limiting device being provided between the sliding block and the end block, which spacing limiting, device limits the maximum spacing in the tangential direction between the sliding block and the end block. In this way, it is prevented that the end block can move away from the spring device to such an extent that it is no longer possible for the end block to act on the spring device or on an end-side spring element thereof. A spacing limiting device could for example be designed in the form of a catch cable or catch arm.

In a further preferred embodiment of the torsional vibration damper according to the invention, the spring element between the sliding block and the end block is relaxed when the maximum spacing between the sliding block and the end block is reached. A compact design of the spring device is obtained in this way, while a preload of the spring element between the sliding block and the end block, which would lead to permanent loading of the spacing limiting device, is prevented.

According to a further advantageous embodiment of the torsional vibration damper according to the invention, the end block and/or the sliding block have/has a support surface for radially supporting the adjoining spring element.

In a further preferred embodiment of the torsional vibration damper according to the invention, the end block and/or the secondary driver are/is designed such that the end block is not, in any position, supported on the secondary driver. The end block accordingly does not impact against the secondary driver, which reduces the wear to the end block. In this case, a combination with the above-specified spacing limiting device is particularly expedient in order to limit the movement of the end block.

The drive train according to the invention for a motor vehicle has a torsional vibration damper according to the invention of the above-described type.

In one preferred embodiment of the drive train according to the invention, the primary element is assigned to the input side of the torsional vibration damper and the secondary element is assigned to the output side of the torsional vibration damper, or vice versa. It is thus possible, in the first alternative, for the primary element to be assigned, for example, to the crankshaft of the internal combustion engine, whereas the secondary element may be assigned to a transmission input shaft. In the second alternative, the reverse would apply.

Other objects, features, and advantages of the present invention will be readily appreciated as the same becomes better understood while reading the subsequent description taken in conjunction with the accompanying drawings.

BRIEF DESCRIPTION OF THE DRAWINGS

The invention is explained in more detail below on the basis of exemplary embodiments and with reference to the appended drawings, in which.

DETAILED DESCRIPTION OF THE INVENTION

Figure 1:
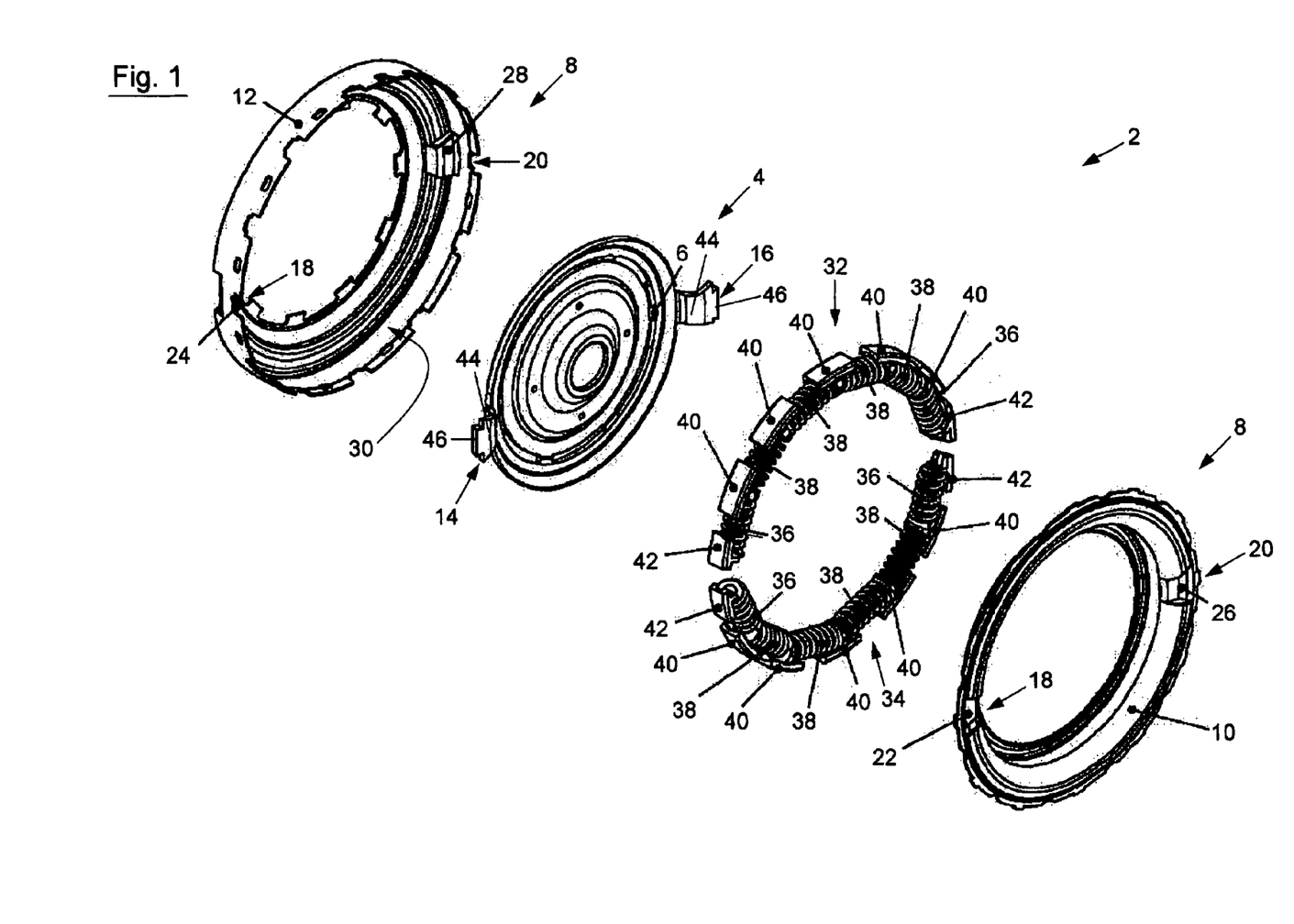
FIG. 1 shows a perspective exploded illustration of a first embodiment of the torsional vibration damper according to the invention.

FIG. 1 shows a perspective exploded illustration of a first embodiment of the torsional vibration damper 2 according to the invention. The torsional vibration damper 2 has an engine-side primary element 4 in the form of a central disk 6, and a transmission-side secondary element 8, wherein the latter is composed of a front side disk 10 and a rear side disk 12 which are rotationally fixedly connected to one another. The primary element 4 is thus assigned to the input side of the torsional vibration damper 2 and the secondary element 8 is thus assigned to the output side of the torsional vibration damper 2, though it should be noted that the primary element 4 may likewise be assigned to the output side, or to the engine, while the secondary element 8 could be assigned to the input side, or to the transmission.

The primary element 4 in the form of the central disk 6 has two drivers which are referred to below as primary drivers 14, 16 and which are arranged opposite one another on the outer periphery of the central disk 6. Two drivers are likewise provided on the two side disks 10, 12 of the secondary element 8, which drivers are referred to below as secondary drivers 18, 20. Like the secondary element 8 itself, the secondary drivers 18 and 20 are also composed, respectively, of a front part 22 on the front side disk 10 and a rear part 24 on the rear side disk 12 and of a front part 26 on the front side disk 10 and a rear part 28 on the rear side disk 12. The primary and secondary drivers 14, 16, 18, 20 are preferably formed in one piece with the primary and secondary elements 4, 8 respectively.

In the assembled state, an annular chamber 30 is formed between the front side disk 10 and the rear side disk 12. Two spring devices 32, 34 are provided in the annular chamber 30 between the primary and secondary drivers 14, 16, 18, 20, which spring devices 32, 34 serve for resiliently elastically coupling the primary element 4 and secondary element 8. The spring devices 32, 34 have a plurality of spring elements 36, 38 which are arranged in succession in the tangential direction and which are preferably embodied as spiral springs. Instead of a single spring element 36, 38, a spring set comprising a plurality of spring elements arranged one inside the other would also be conceivable. The spring elements 36 are end-side spring elements 36 which, at the face side, can directly adjoin the primary and secondary drivers 14, 16, 18, 20. Said end-side spring elements 36 are to be distinguished from the interposed spring elements 38, which do not adjoin any primary or secondary drivers 14, 16, 18, 20.

The spring devices 32, 34 also comprise sliding blocks 40 which are arranged at the face side between the spring elements 36, 38. Said interposed sliding blocks 40 are to be distinguished from the so-called end blocks 42, which are arranged on the end side of the respective spring device 32, 34. In the present embodiment, therefore, a total of four end blocks 42 are arranged on end-side spring elements 36, specifically in each case on those face sides which face toward the primary and secondary drivers 14, 16, 18, 20 respectively and which face away from the adjoining sliding block 40. The design of the sliding and end blocks 40, 42 is explained in more detail further below with reference to FIGS. 2 to 5.

A rotation or a torque of the engine-side primary element 4 can be transmitted in a resiliently elastic manner to the transmission-side secondary element 8 via the primary drivers 14, 16 of the central disk 6, the spring devices 32, 34 and the secondary drivers 18, 20 of the side disks 10, 12 which are rotationally fixedly connected to one another.

The further design of the torsional vibration damper 2 is explained below with reference to FIGS. 2 to 5. The primary drivers 14, 16 on the central disk 6 are divided substantially into two sections, specifically a first section 44, which is arranged radially closer to the central disk 6, for support on the spring devices 32, 34, and a second section 46, which is arranged radially at the outside on the first section 44, for support on an end block 42. The central disk 6 may be rotated both in the one tangential direction 48 and also in the opposite tangential direction 50, as a result of which the primary drivers 14, 16 can be rotated in both directions against the corresponding spring devices 32, 34 or end blocks 42. The second section 46 is recessed relative to the first section 44 both with respect to the one tangential direction 48 and also with respect to the opposite tangential direction 50. The first section 44 thus has a first support edge 52 which faces toward the spring devices 32, 34, while the second section 46 has a second support edge 54 which is recessed relative to the first support edge 52, such that there is a spacing "x" between the first and second support edges 52, 54 in the tangential directions 48 and 50.

Figure 5:
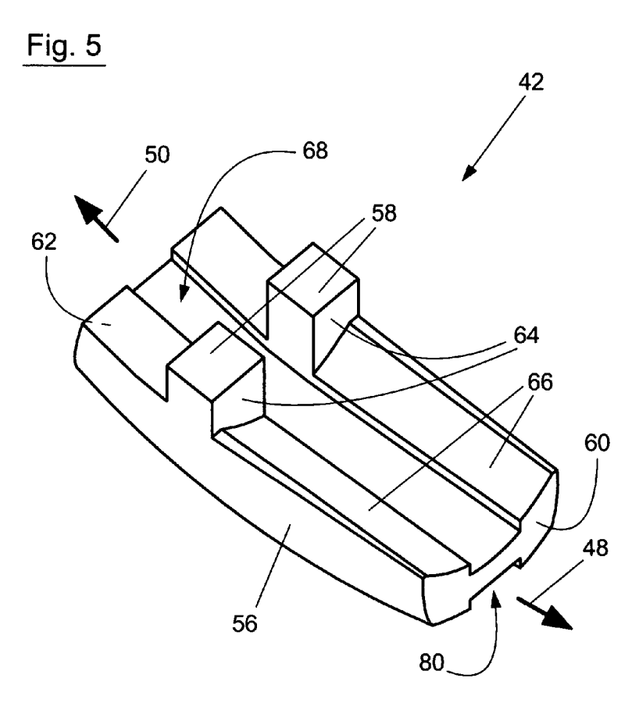
FIG. 5 shows a perspective illustration of the end block from FIGS. 1 to 4.

The end block 42, which is composed of plastic and which is illustrated in a perspective view in FIG. 5, is formed in one piece and comprises a sliding part 56, which is situated at the outside in the installed state, for the sliding support of the end block 42 on the secondary element 8, and a radially inwardly projecting support part 58, which is arranged on the sliding part 56, for support of the end-side spring element 36 of the spring device 32 on the end block 42. In this embodiment, the plastic is fiber-reinforced. The sliding block 56 extends, proceeding from the support part 58, both in the one tangential direction 48 and also in the opposite tangential direction 50, such that the end block 42 is prevented from tilting, with the sliding part 56 forming a first face side 60, which points in the tangential direction 48, and a second face side 62, which points in the tangential direction 50, of the end block 42. The support part 58 has a support surface 64 which faces toward the end-side spring element 36 and which points in the tangential direction 48 and against which the face side of the end-side spring element 36 is supported. The support part 58 is accordingly designed such that the spring device 32 or the end-side spring element 36 is supported on the support part 58 only in the direction of the adjoining primary driver 16. There is a spacing "y" in the tangential direction 48 or 50 between the second face side 62 of the end block 42 and the support surface 64, which spacing "y" is smaller than the spacing "x" between the first support edge 52 and the second support edge 54 of the primary driver 16.

The radially inwardly pointing surface of the sliding part 56 of the end block 42 also forms a support surface 66 for radially supporting the adjoining end-side spring element 36, with the support surface 66 preferably being curved transversely with respect to the tangential direction 48 or 50, as shown in FIG. 5. A cutout 68 for the insertion or leadthrough, without contact, of the first section 44 of the primary driver 16 is also provided in the radially inwardly pointing surface of the sliding block 42. For this purpose, the cutout 68 is formed in the manner of a groove and extends continuously in the tangential direction 50 from the first face side 60 to the second face side 62 of the end block 42. Here, the groove-shaped cutout 68 divides the support part 58, the support surface 64 and the support surface 66 into two parts, which preferably have the same dimensions.

The sliding block 40 has a similar design to the end block 42. The sliding block 40, which is produced in one piece from fiber-reinforced plastic, thus has a sliding part 70, for the sliding support of the sliding block 40 on the secondary element 8, and an intermediate part 72 for the face-side support of the spring elements 36, 38 which adjoin the sliding block 40. The sliding part 70 of the sliding block 40 in turn has, on its radially inwardly pointing surface, a support surface 74 for radially supporting the spring elements 36, 38.

Figure 2:
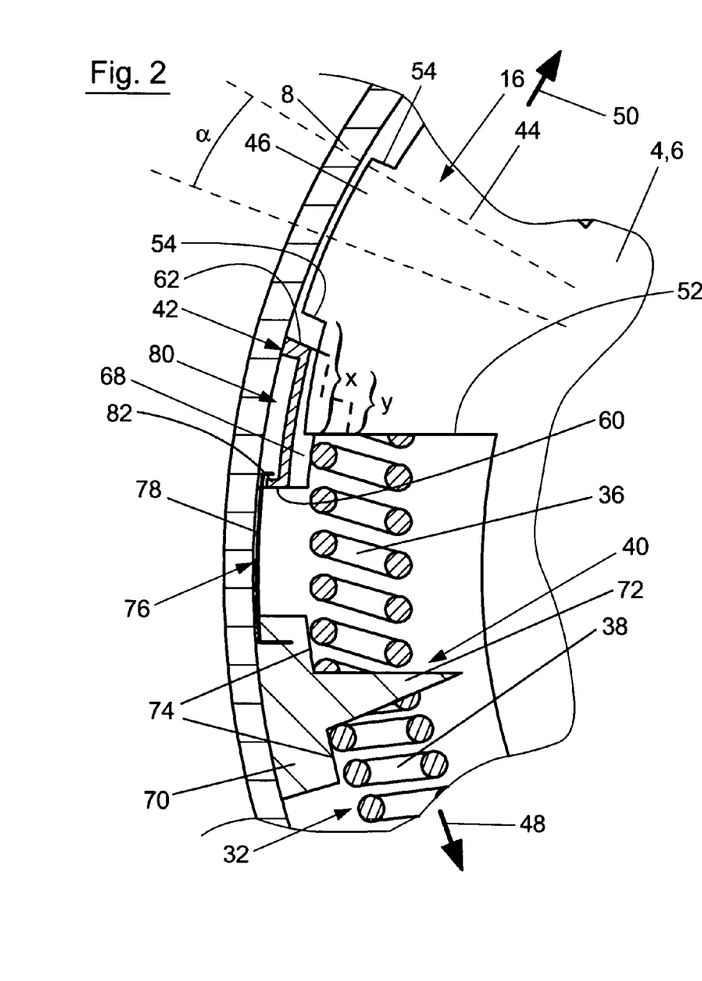
FIG. 2 shows a partial schematic front view of the torsional vibration damper from FIG. 1 in a sectioned illustration with the primary element in a first position.

A spacing limiting device 76 is provided between the end block 42 and that sliding block 40 which is arranged adjacent to the end block 42. Said spacing limiting device 76 serves to limit or predetermine the maximum possible spacing between the end block 42 and the sliding block 40 in the tangential direction 48 or 50. In the illustrated embodiment, the spacing limiting device 76 is formed by a hook-shaped element 78 which, at one side, is fastened to the sliding block 40 and, at the other side, is arranged in a movable fashion in a recess 80 in the end block 42. If the maximum spacing between the sliding block 40 and the end block 42 is reached, as shown in FIG. 2, then the hook-shaped element 78 engages behind a projection 82 in the recess 80 and prevents a further movement of the end block 42 relative to the sliding block 40 in the tangential direction 50. Once said maximum spacing is reached, the end-side spring element 36 is relaxed.

The mode of operation and further features of the torsional vibration damper 2 are described below with reference to FIGS. 2 to 4.

The primary element 86 or the central disk 6 can be rotated relative to the secondary element 92 by a first angle α from a neutral position into a first position which is shown in FIG. 2. In the first position, the first section 44 of the primary driver 16 is inserted, without contact, into the groove-shaped cutout 68 in the end block 42. Only the first support edge 52 of the first section 44 of the primary driver 16 is supported on the face side of the end-side spring element 36, such that a torque can be transmitted from the primary driver 16 directly to the end-side spring element 36. In contrast, the second support edge 54 of the second section 46 of the primary driver 16 is spaced apart from the second face side 62 of the end block 42, which results from the fact that the spacing "x" is greater than the spacing "y."

Figure 3:
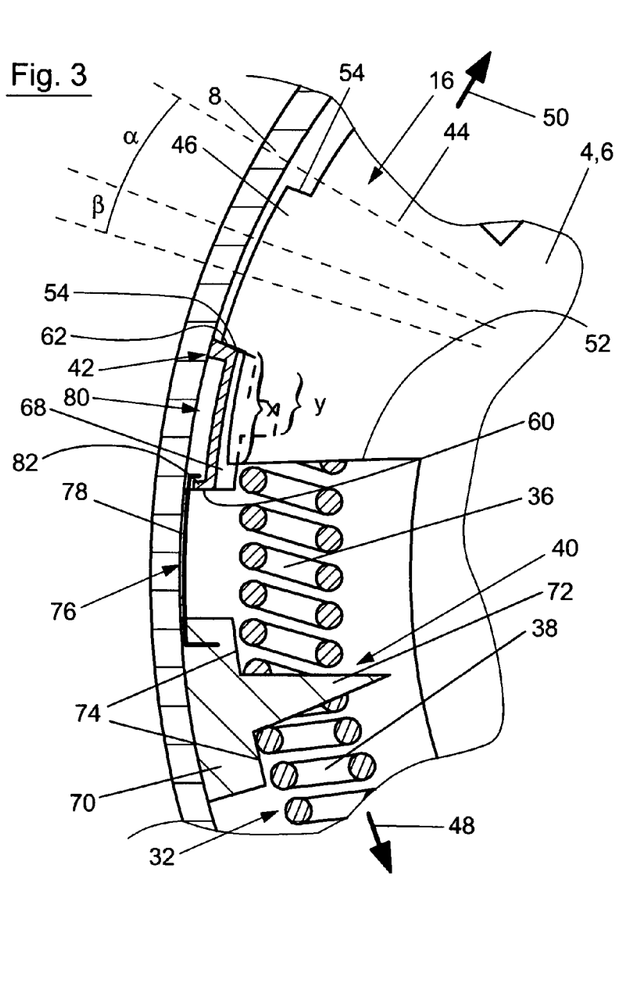
FIG. 3 shows the torsional vibration damper from FIG. 2 with the primary element in a second position.

If the central disk 6 is rotated onward in the tangential direction relative to the secondary element 8 by an angle β, then the primary element 4 moves into a second position which is shown in FIG. 3. In the second position, the primary driver 16 is still supported on the end-side spring element 36. Furthermore, the second support edge 54 of the second section 46 of the primary driver 16 is supported on the second face side 62 of the end block 42. It is however decisive that the end block 42 and the primary driver 16 are designed such that, in the first and second positions of the primary element 4, the torque of the torsional vibration damper is transmitted exclusively directly between the primary driver 16 and the end-side spring element 36 of the spring device 32. An indirect transmission from the primary driver 16 via the end block 42 to the end-side spring element 36 does not take place. This is realized in the present embodiment in that the spacing "x" is greater than the spacing "y." In this way, the end block 42 has play in the tangential direction 48 or 50 even when the second section 46 of the primary driver 16 is supported on the end block 42.

Figure 4:
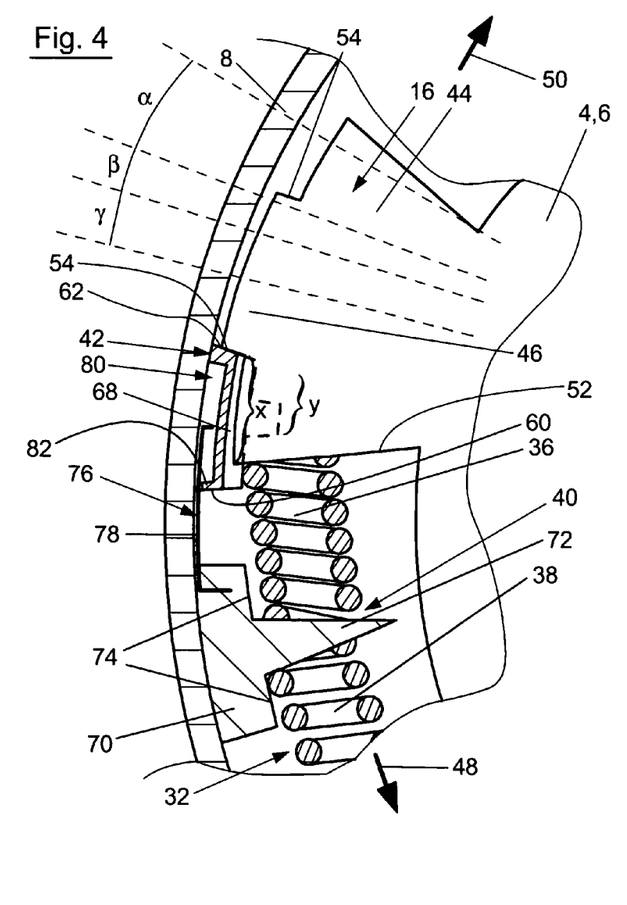
FIG. 4 shows the torsional vibration damper from FIG. 3 with the primary element in a third position.

FIG. 4 shows the primary element 4 in a third position relative to the secondary element 8. In the third position, the primary element 4 is rotated by a further angle γ relative to the secondary element 8. In this way, the spring element 36 is compressed to a greater extent and the hook-shaped element 78 of the spacing limiting device 76 is pushed within the recess 80 in the end block 42. An indirect transmission of torque from the primary driver 16 to the end-side spring element 36 via the end block 42 does not take place in any position of the primary element 4 relative to the secondary element 8. Furthermore, the end block 42 and the secondary drivers 18, 20 are designed such that the end block 42 is not, in any position, supported against the secondary driver 18, 20. The end block 42 is thus designed to be so short in the radial direction that it can protrude through under the secondary driver 18, 20 at the outside.

Figure 6:
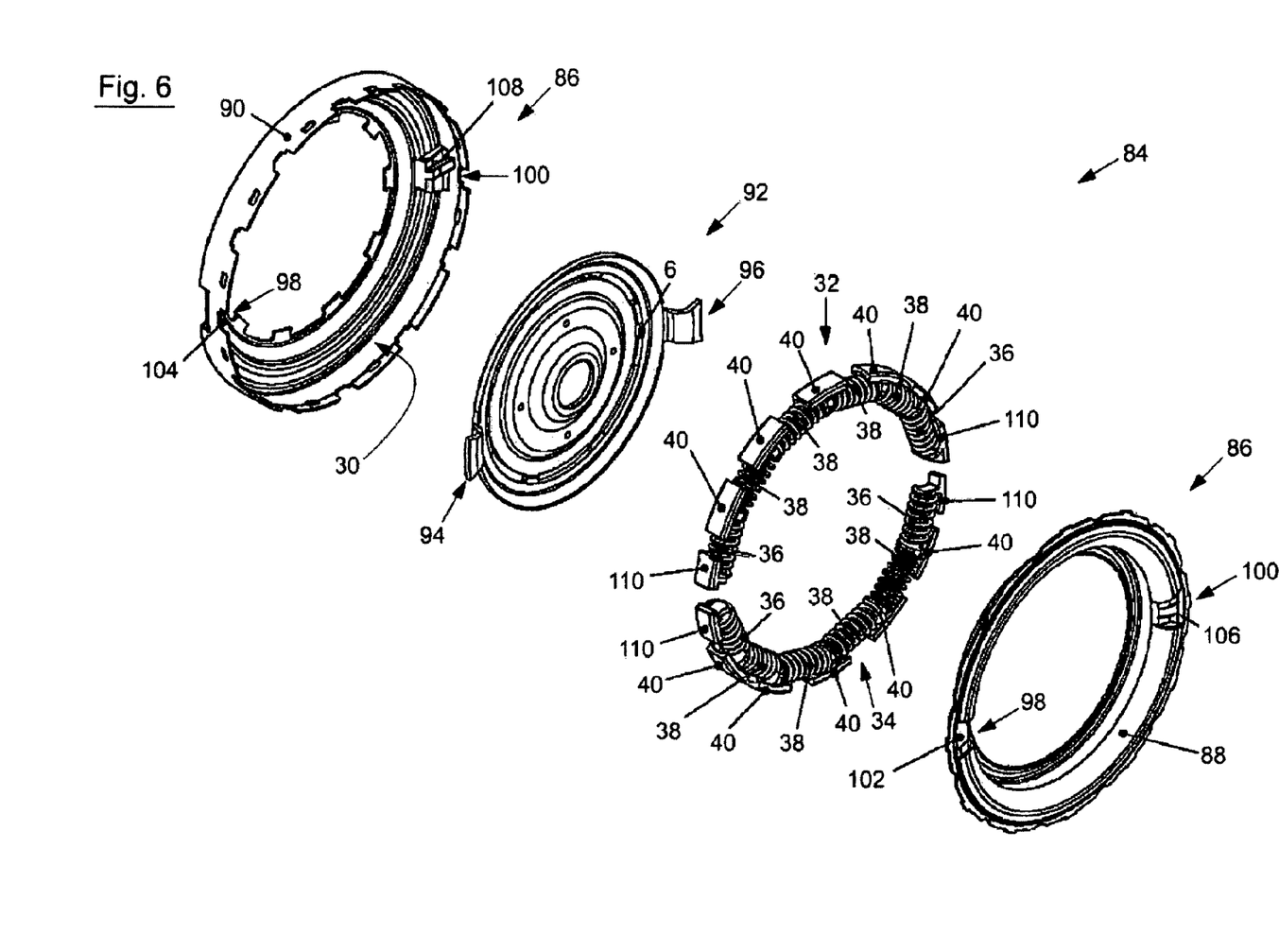
FIG. 6 shows a perspective exploded illustration of a second embodiment of the torsional vibration damper according to the invention.

FIG. 6 shows a perspective exploded illustration of a second embodiment of the torsional vibration damper 84 according to the invention. The torsional vibration damper 84 has an engine-side primary element 86, which is composed of a front side disk 88 and a rear side disk 90, which are rotationally fixedly connected to one another, and a transmission-side secondary element 92, with the latter being designed in the form of a central disk 6. The primary element 86 is thus assigned to the input side of the torsional vibration damper 84 and the secondary element 92 is thus assigned to the output side of the torsional vibration damper 84, though it should be noted that the primary element 86 may likewise be assigned to the output side, or to the transmission, while the secondary element 92 could be assigned to the input side, or to the engine.

The secondary element 92 in the form of the central disk 6 has two drivers which are referred to below as secondary drivers 94, 96 and which are arranged opposite one another on the outer periphery of the central disk. Two drivers are likewise provided on the two side disks 88, 90 of the primary element 86, which drivers are referred to below as primary drivers 98, 100. Like the primary element 86 itself, the secondary drivers 98 and 100 are also composed, respectively, of a front part 102 on the front side disk 88 and a rear part 104 on the rear side disk 90 and of a front part 106 on the front side disk 88 and a rear part 108 on the rear side disk 90. The primary and secondary drivers 98, 100; 94, 96 are preferably formed in one piece with the primary and secondary elements 86; 92 respectively.

In the assembled state, an annular chamber 30 is again formed between the front side disk 88 and the rear side disk 90. Two spring devices 32, 34 are provided in the annular chamber 30 between the primary and secondary drivers 98, 100; 94, 96, which spring devices 32, 34 serve for resiliently elastically coupling the primary element 86 and secondary element 92. The spring devices 32, 34 correspond substantially to the spring devices from FIG. 1, such that only the differences are explained here, and the above description otherwise applies correspondingly. It is thus the case in particular that the end blocks 110 have a different design, which is explained in more detail further below.

A rotation or a torque of the engine-side primary element 86 can be transmitted in a resiliently elastic manner to the transmission-side secondary element 92 via the primary drivers 98, 100, the spring devices 32, 34 and the secondary drivers 94, 96. In a reverse arrangement in the drive train, a rotation or a torque of the secondary element 92 could be transmitted in a resiliently elastic fashion to the primary element 86 via the secondary drivers 94, 96, the spring devices 32, 34 and the primary drivers 98, 100.

The further design of the torsional vibration damper 84 is explained below with reference to FIGS. 7 to 11. The primary drivers 98, 100 or the front and rear parts 102, 104 thereof are divided substantially into two sections, specifically a first section 112, which is arranged axially further outward in the annular chamber 30, for support on the spring devices 32, 34, and a second section 114, which is arranged axially further inward in the annular chamber 30 on the first section 112, for support on an end block 110. The second section 114 is recessed relative to the first section 112 both with respect to the one tangential direction 48 and also with respect to the opposite tangential direction 50. The first section 112 thus has a first support section 116 which faces toward one of the spring devices 32, while the second section 114 has a second support section 118 which is recessed relative to the first support section 116, such that there is a spacing "x" between the first and second support sections 116, 118 in the tangential directions 48 and 50.

Figure 11:
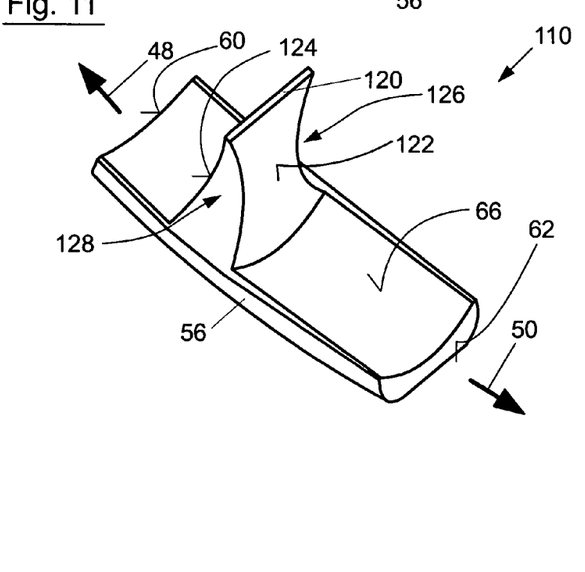
FIG. 11 shows a perspective illustration of the end block from FIGS. 6 to 10.

The end block 110, which is composed of plastic and which is illustrated in a perspective view in FIG. 11, is formed in one piece and comprises a sliding part 56, which is situated at the outside in the installed state, for the sliding support of the end block 110 on the primary element 86, and a radially inwardly projecting support part 120, which is arranged on the sliding part 56, for support of the end-side spring element 36 of the spring device 32 on the end block 110. The sliding block 56 extends, proceeding from the support part 120, both in the one tangential direction 48 and also in the opposite tangential direction 50 in order to obtain the advantages already explained above. The support part 120 has a support surface 122 which faces toward the end-side spring element 36 and which points in the tangential direction 48 and against which the face side of the end-side spring element 36 is supported. The support part 120 also has a support surface 124 which faces toward the secondary driver 94 and which points in the tangential direction 50 and against which the secondary driver 94 is supported. The support part 120 has, in the tangential direction 48, 50, a thickness "z" which is smaller than the spacing "x."

In contrast to the end block 42 according to FIG. 5, the support part 120 of the end block 110 has, on its two sides which point in the axial direction, in each case one cutout 126, 128 for the insertion or leadthrough, without contact, of the first section 112 of the primary driver 98. For this purpose, the cutouts 126, 128 are formed in the manner of a groove and extend continuously in the tangential direction 48 from the first support surface 122 to the second support surface 124 of the support part 120 of the end block 110. The above description of the end block 42 otherwise applies correspondingly to the end block 110, where the same reference symbols are used.

The mode of operation and further features of the torsional vibration damper 84 are described below with reference to FIGS. 7 to 10.

Figure 7:
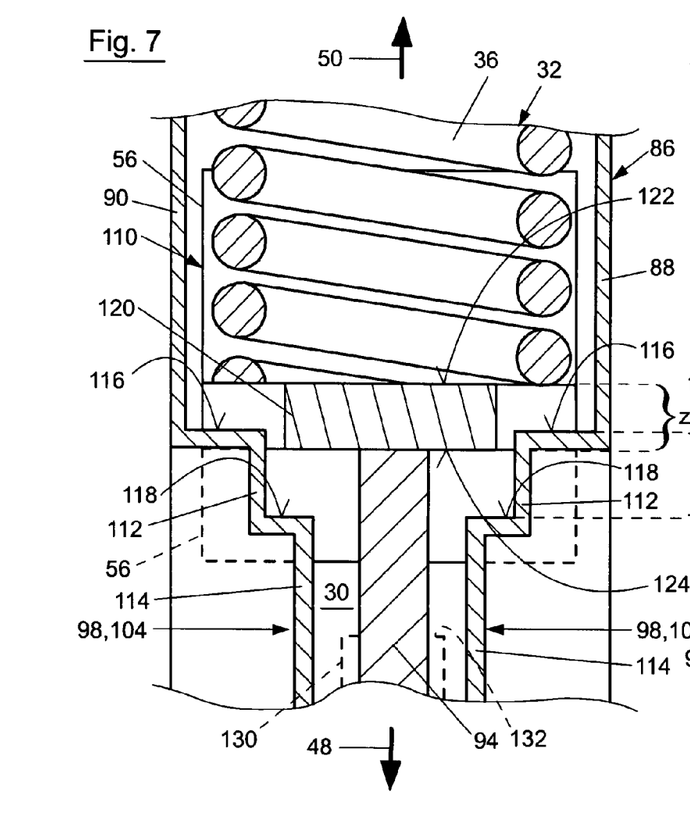
FIG. 7 shows a partial schematic front view of the torsional vibration damper from FIG. 6 in a sectioned illustration with the primary element in a neutral position.
Figure 8:
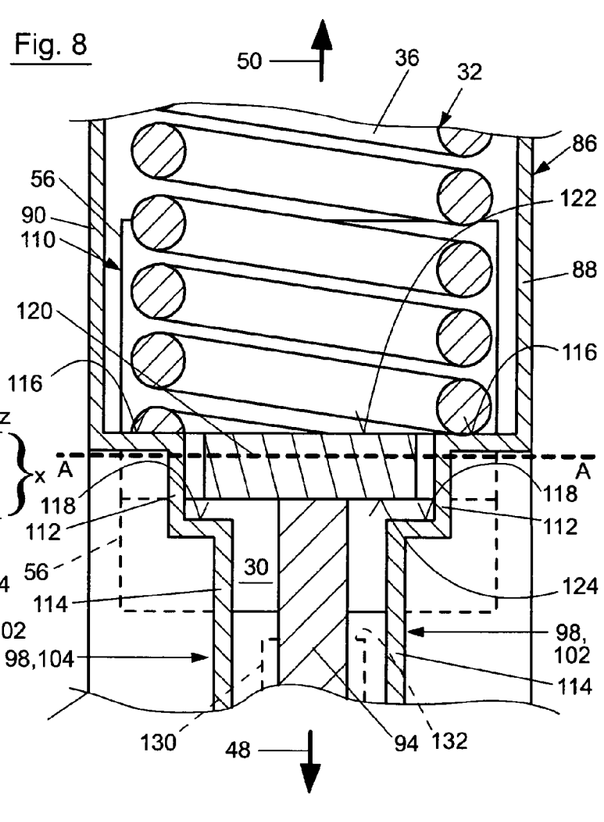
FIG. 8 shows the torsional vibration damper from FIG. 7 with the primary element in a first position.

The primary element 86 can be rotated relative to the secondary element 92 from a neutral position, which is shown in FIG. 7, into a first position which is shown in FIG. 8. In the neutral position, the face side of the spring element 36 bears against the support surface 122 of the support part 120 of the end block 110, while the secondary driver 94 of the secondary element 92 is supported on the other support surface 124 of the support part 120. Depending on the thickness "z" of the support part 120, the width of the secondary driver 94 in the tangential direction 48, 50 and the width of the primary driver 98 in the tangential direction 48, 50, it is possible for the face side of the spring element 36 to bear against the support section 116 of the primary driver 98 even when the primary element 86 is in the neutral position. In the illustrated example, in the neutral position, the spring element 36 does not bear against the support section 116 of the primary driver 98.

Figure 10:
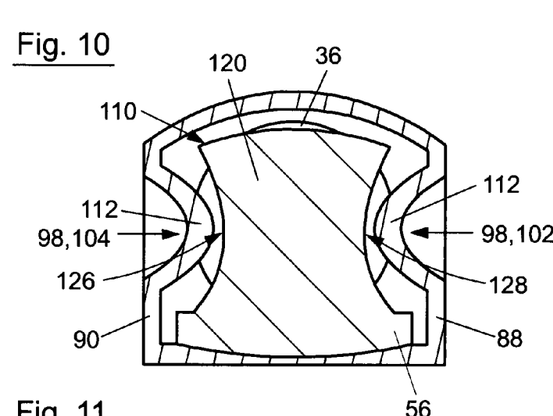
FIG. 10 shows a sectioned view along the section line "A-A" in FIG. 8.

In the first position, illustrated in FIG. 8, the first section 112 of the primary driver 98 is inserted, without contact, into the groove-shaped cutout 126, 128 in the end block 110, as can also be seen from FIG. 10. Only the first support section 116 of the first section 112 of the primary driver 98 is supported on the face side of the end-side spring element 36, such that a torque can be transmitted from the primary driver 98 directly to the end-side spring element 36. In contrast, the second support section 118 of the second section 114 of the primary driver 98 is spaced apart from the support surface 124 of the end block 110, which results from the fact that the spacing "x" is greater than the thickness "z" of the support part 120.

Figure 9:
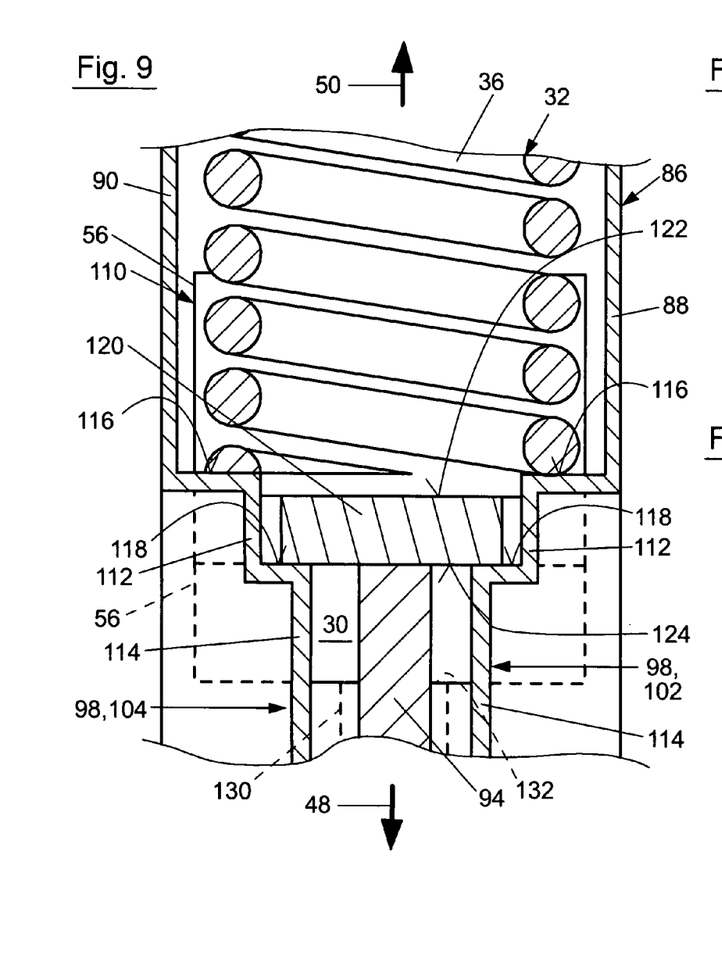
FIG. 9 shows the torsional vibration damper from FIG. 2 with the primary element in a second position.

If the primary and secondary elements 86, 92 are rotated onward relative to one another in the same tangential direction 48, then the primary element 86 moves into a second position which is shown in FIG. 9. In the second position, the primary driver 98 is still supported on the end-side spring element 36. Furthermore, the second support section 118 of the second section 114 of the primary driver 98 is supported on the second support surface 124 of the end block 110. It is however decisive that the end block 110 and the primary driver 98 are designed such that, in the first and second positions of the primary element 86, the torque of the torsional vibration damper 84 is transmitted exclusively directly between the primary driver 98 and the end-side spring element 36 of the spring device 32. An indirect transmission from the primary driver 98 via the end block 110 to the end-side spring element 36 does not take place. This is realized in the present embodiment in that the spacing "x" is greater than the thickness "z." In this way, the end block 110 has play in the tangential direction 48 or 50 even when the second support section 118 of the primary driver 98 is supported on the end block 110.

It would alternatively be possible, instead of the second section 114, for a lug 130 which projects into the annular chamber to be provided on the primary element 86, which lug 130 forms a support section 132 against which the face surface 60 of the sliding part 56 bears when the primary element 86 is in the second position. Such a lug 130 is indicated by dashed lines in FIGS. 7 to 9.

In any case, the second section 114 or the lug 130 prevents the end block 110 from sliding through completely in the region of the primary driver 98, such that reliable functioning of the torsional vibration damper 84 is ensured.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

The invention claimed is:

1. A torsional vibration damper comprising:
    a primary element (4; 86) with at least one primary driver (14, 16; 98, 100);
    a secondary element (8; 92) with at least one secondary driver (18, 20; 96, 98);
    at least one spring device (32, 34) between the primary driver (14, 16; 98, 100) and the secondary driver (18, 20; 96, 98) for resiliently elastic coupling of the primary element (4; 86) and secondary element (8; 92); and
    at least one end block (42; 110) which is arranged on an end side of the spring device (32, 34), with the primary element (4; 86) being rotatable relative to the secondary element (8; 92) from a neutral position into a first position, in which the primary driver (14, 16; 98, 100) is supported only on the spring device (32, 34), and from the first position onward into a second position, in which the primary driver (14, 16; 98, 100) is supported on the spring device (32, 34) and on the end block (42; 110), wherein in the first and second positions of the primary element (4; 86), torque of the torsional vibration damper (2; 84) can be transmitted exclusively directly between the primary driver (14, 16; 98, 100) and the spring device (32, 34), the primary driver (14, 16; 98, 100) has a first section (44; 112) for support on the spring device (32, 34) and a second section (46; 114) for support on the end block (42; 110), the second section (46; 114) is arranged so as to be recessed relative to the first section (44; 112) with respect to a tangential direction (48, 50), and the spring device (32, 34) has at least two spring elements (36, 38) which are arranged in series in the tangential direction (48, 50) and between which is arranged a sliding block (40), with a spacing limiting device (76) being provided between the sliding block (40) and the end block (42), which spacing limiting device (76) limits maximum spacing in the tangential direction (48, 50) between the sliding block (40) and the end block (42).

2. The torsional vibration damper as set forth in claim 1, wherein the second section (46) is arranged radially at an outside on the first section (44).

3. The torsional vibration damper as set forth in claim 1, wherein the end block (42; 110) has a cutout (68; 126, 128) for insertion, without contact, of the first section (44; 112) of the primary driver (14, 16; 98, 100).

4. The torsional vibration damper as set forth in claim 3, wherein the cutout (68; 126, 128) is continuous in the tangential direction (48, 50).

5. The torsional vibration damper as set forth in claim 4, wherein the cutout (68; 126, 128) is groove-shaped.

6. The torsional vibration damper as set forth in claim 3, wherein the second section (46; 114) of the primary driver (14, 16; 98, 100) can be supported on either of a face side (62) and a support surface (124) of the end block (42; 110).

7. The torsional vibration damper as set forth in claim 1, wherein the end block (42; 110) has at least one support part (58; 120) for supporting the spring device (32, 34) on the end block (42; 110).

8. The torsional vibration damper as set forth in claim 7, wherein the end block (42; 110) has a sliding part (56), which extends in the tangential direction (48, 50), for sliding support of the end block (42; 100), on which at least one of the sliding part (56) and the support part (58; 120) is arranged.

9. The torsional vibration damper as set forth in claim 1, wherein the spring element (36) between the sliding block (40) and the end block (42) is relaxed when the maximum spacing between the sliding block (40) and the end block (42) is reached.

10. The torsional vibration damper as set forth in claim 1, wherein at least one of the end block (42; 110) and the sliding block (40) has a support surface (66, 74) for radially supporting adjoining ones of the spring element (36, 38).

11. The torsional vibration damper as set forth in claim 1, wherein the end block (42; 110) is not, in any position, supported on the secondary driver (18, 20; 94, 96).

12. A drive train for a motor vehicle having a torsional vibration damper (2, 84), the torsional vibration damper comprising:
    a primary element (4; 86) with at least one primary driver (14, 16; 98, 100);
    a secondary element (8; 92) with at least one secondary driver (18, 20; 96, 98);
    at least one spring device (32, 34) between the primary driver (14, 16; 98, 100) and the secondary driver (18, 20; 96, 98) for resiliently elastic coupling of the primary element (4; 86) and secondary element (8; 92); and
    at least one end block (42; 110) which is arranged on an end side of the spring device (32, 34), with the primary element (4; 86) being rotatable relative to the secondary element (8; 92) from a neutral position into a first position, in which the primary driver (14, 16; 98, 100) is supported only on the spring device (32, 34), and from the first position onward into a second position, in which the primary driver (14, 16; 98, 100) is supported on the spring device (32, 34) and on the end block (42; 110), wherein in the first and second positions of the primary element (4; 86), torque of the torsional vibration damper (2; 84) can be transmitted exclusively directly between the primary driver (14, 16; 98, 100) and the spring device (32, 34), the primary driver (14, 16; 98, 100) has a first section (44; 112) for support on the spring device (32, 34) and a second section (46; 114) for support on the end block (42; 110), the second section (46; 114) is arranged so as to be recessed relative to the first section (44; 112) with respect to a tangential direction (48, 50), and the spring device (32, 34) has at least two spring elements (36, 38) which are arranged in series in the tangential direction (48, 50) and between which is arranged a sliding block (40), with a spacing limiting device (76) being provided between the sliding block (40) and the end block (42), which spacing limiting device (761 limits maximum spacing in the tangential direction (48, 50) between the sliding block (40) and the end block (42).

13. The drive train as set forth in claim 12, wherein the primary element (4; 86) is assigned to an input side of the torsional vibration damper (2; 84) and the secondary element (8; 92) is assigned to an output side of the torsional vibration damper (2; 84).

14. The drive train as set forth in claim 12, wherein the primary element (4; 86) is assigned to an output side of the torsional vibration damper (2; 84) and the secondary element (8; 92) is assigned to an intput side of the torsional vibration damper (2; 84).

* * * * *